United States Patent
Ariyaratne et al.

(10) Patent No.: US 11,648,959 B2
(45) Date of Patent: May 16, 2023

(54) IN-VEHICLE OPERATION OF SIMULATION SCENARIOS DURING AUTONOMOUS VEHICLE RUNS

(71) Applicant: Argo AI, LLC, Pittsburgh, PA (US)

(72) Inventors: Arjuna Ariyaratne, Pittsburgh, PA (US); Thomas Carl Ackenhausen, Ann Arbor, MI (US); Patrick Michael Carmody, Dexter, MI (US)

(73) Assignee: ARGO AI, LLC, Pittsburgh, IA (US)

( * ) Notice: Subject to any disclaimer, the term of this patent is extended or adjusted under 35 U.S.C. 154(b) by 0 days.

(21) Appl. No.: 17/074,807

(22) Filed: Oct. 20, 2020

(65) Prior Publication Data
US 2022/0119006 A1  Apr. 21, 2022

(51) Int. Cl.
*B60W 60/00* (2020.01)
*B60W 30/095* (2012.01)
(Continued)

(52) U.S. Cl.
CPC ........ *B60W 60/0011* (2020.02); *B60W 30/09* (2013.01); *B60W 30/0956* (2013.01);
(Continued)

(58) Field of Classification Search
CPC ............. B60W 60/0011; B60W 30/09; B60W 30/0956; B60W 40/105; B60W 50/0205;
(Continued)

(56) References Cited

U.S. PATENT DOCUMENTS

| | | | |
|---|---|---|---|
| 7,693,624 | B2 | 4/2010 | Duggan et al. |
| 9,612,123 | B1 | 4/2017 | Levinson et al. |

(Continued)

FOREIGN PATENT DOCUMENTS

| | | | | |
|---|---|---|---|---|
| CA | 3052234 A1 | * | 8/2018 | ............... G06N 7/08 |
| CN | 108292474 A | * | 7/2018 | ............. G01C 21/26 |

(Continued)

OTHER PUBLICATIONS

CN-108292474-A translation (Year: 2018).*
(Continued)

*Primary Examiner* — Jeff A Burke
*Assistant Examiner* — Kyle T Johnson
(74) *Attorney, Agent, or Firm* — Fox Rothschild, LLP (57) ABSTRACT

This document describes methods by which an autonomous vehicle deploys a simulation scenario while operating in a real-world environment. The vehicle's sensors collect perception data. During a run of the vehicle in a real-world environment, the vehicle's on-board computing system will: (i) receive the perception data; (ii) publish the perception data to a muxing tool of the on-board computing system; (iii) generate simulation data that identifies and labels one or more simulated objects in the environment; (iv) publish the simulation data to the muxing tool; (v) use the muxing tool to add at least a portion of the simulation data to the perception data to yield augmented perception data; and (v) use at least a portion of the augmented perception data to make one or more navigation decisions based for the autonomous vehicle.

21 Claims, 3 Drawing Sheets

(51) Int. Cl.
| | |
|---|---|
| *B60W 30/09* | (2012.01) |
| *G01C 21/34* | (2006.01) |
| *B60W 50/02* | (2012.01) |
| *B60W 40/105* | (2012.01) |
| *G01C 21/00* | (2006.01) |
| *G01S 19/42* | (2010.01) |

(52) U.S. Cl.
CPC ...... *B60W 40/105* (2013.01); *B60W 50/0205* (2013.01); *B60W 50/0225* (2013.01); *G01C 21/3461* (2013.01); *G01C 21/3804* (2020.08); *B60W 2420/42* (2013.01); *B60W 2420/52* (2013.01); *B60W 2520/10* (2013.01); *G01S 19/42* (2013.01)

(58) Field of Classification Search
CPC ......... B60W 50/0225; B60W 2420/42; B60W 2420/52; B60W 2520/10; G01C 21/3461; G01C 21/3804; G01S 19/42
See application file for complete search history.

(56) References Cited

U.S. PATENT DOCUMENTS

| | | | | |
|---|---|---|---|---|
| 9,836,895 | B1* | 12/2017 | Nygaard | G05D 1/0088 |
| 10,002,471 | B2 | 6/2018 | Blayvas et al. | |
| 10,019,011 | B1 | 7/2018 | Green et al. | |
| 10,031,526 | B1 | 7/2018 | Li et al. | |
| 10,156,848 | B1* | 12/2018 | Konrardy | B60R 16/0234 |
| 10,395,433 | B2 | 8/2019 | Tomatsu | |
| 10,453,260 | B2 | 10/2019 | Alaniz et al. | |
| 10,482,003 | B1* | 11/2019 | Bondor | G06F 11/3684 |
| 10,852,721 | B1 | 12/2020 | Smith et al. | |
| 11,409,304 | B1 | 8/2022 | Cai et al. | |
| 2005/0209983 | A1* | 9/2005 | MacPherson | G06T 11/206 |
| 2008/0040004 | A1* | 2/2008 | Breed | G01S 7/0231 |
| | | | | 701/45 |
| 2008/0040029 | A1* | 2/2008 | Breed | G01S 19/17 |
| | | | | 701/514 |
| 2010/0115411 | A1* | 5/2010 | Sorokin | H04N 5/2627 |
| | | | | 715/723 |
| 2011/0167574 | A1* | 7/2011 | Stout | G05D 1/0255 |
| | | | | 15/3 |
| 2011/0305183 | A1* | 12/2011 | Hsu | H04W 72/005 |
| | | | | 370/312 |
| 2014/0289174 | A1 | 9/2014 | Statnikov et al. | |
| 2014/0309789 | A1* | 10/2014 | Ricci | G06F 16/25 |
| | | | | 700/276 |
| 2016/0314224 | A1 | 10/2016 | Wei et al. | |
| 2017/0113664 | A1* | 4/2017 | Nix | H04N 7/188 |
| 2017/0253252 | A1* | 9/2017 | Donnelly | B60W 50/0098 |
| 2017/0267233 | A1* | 9/2017 | Minster | B62D 15/02 |
| 2018/0107770 | A1 | 4/2018 | Cahoon et al. | |
| 2018/0188727 | A1* | 7/2018 | Zhuang | B60W 50/035 |
| 2018/0365888 | A1 | 12/2018 | Satzoda et al. | |
| 2019/0004528 | A1 | 1/2019 | Zhan et al. | |
| 2019/0228118 | A1 | 7/2019 | Hummelshoj | |
| 2019/0250622 | A1* | 8/2019 | Nister | B60W 60/0015 |
| 2019/0301886 | A1 | 10/2019 | Elangovan et al. | |
| 2019/0354643 | A1 | 11/2019 | Shum et al. | |
| 2019/0377351 | A1* | 12/2019 | Phillips | G05D 1/0214 |
| 2020/0050536 | A1 | 2/2020 | Nygaard et al. | |
| 2020/0082248 | A1* | 3/2020 | Villegas | G06N 3/0454 |
| 2020/0192391 | A1 | 6/2020 | Vora et al. | |
| 2020/0209874 | A1* | 7/2020 | Chen | G06F 30/15 |
| 2020/0218979 | A1* | 7/2020 | Kwon | G06N 3/08 |
| 2020/0226225 | A1 | 7/2020 | Zaytsev et al. | |
| 2020/0283016 | A1 | 9/2020 | Blaiotta | |
| 2020/0284883 | A1* | 9/2020 | Ferreira | G01S 7/484 |
| 2020/0309561 | A1* | 10/2020 | Li | G01C 21/3667 |
| 2020/0341466 | A1* | 10/2020 | Pham | G06N 3/04 |
| 2020/0409369 | A1* | 12/2020 | Zaytsev | G05D 1/0088 |
| 2021/0053563 | A1 | 2/2021 | Li et al. | |
| 2021/0096566 | A1* | 4/2021 | Wang | B60W 30/0953 |
| 2021/0108936 | A1* | 4/2021 | Seegmiller | G05D 1/0088 |
| 2021/0132604 | A1* | 5/2021 | Gillett | G06F 30/15 |
| 2021/0155210 | A1* | 5/2021 | Staats | B60T 8/1893 |
| 2021/0309248 | A1* | 10/2021 | Choe | G06N 3/08 |
| 2021/0350046 | A1* | 11/2021 | Bosson | G06F 16/25 |
| | | | | 700/276 |

FOREIGN PATENT DOCUMENTS

| | | |
|---|---|---|
| CN | 108292474 A | 7/2018 |
| WO | 2015173903 A1 | 11/2015 |
| WO | 20180204544 A1 | 11/2018 |

OTHER PUBLICATIONS

Van der Made, R. et al., "Automated Generation of Virtual Driving Scenarios from Test Drive Data", 24th International Technical Conference on the Techanced Safety of Vehicles (ESV), Jun. 8, 2015-Jun. 11, 2015.

Rocklage, E. et al., "Automated Scenario Generation for Regression Testing of Autonomous Vehicles", 2017 IEEE 20th International Conference on Intelligent Transportation Systems (ISC): Workshop.

Guldogus, M., "Proof of Concept of Closed Loop Re-Simulation (CLR) Methods in Verification of Autonomous Vehicles", KTH Schoold of Electrical Engineering (EES), Master's Thesis, 2017.

Markkula, G., "Driver behavior models for evaluating automotive active safety", Department of Applied Mechanics, Chalmers University of Technology, Goteborg, Sweden 2015.

NVIDIA Self-Driving Safety Report, 2018.

"We Deliver the Promise of Autonomy," https://edge-case-research.com/products-services/, Oct. 14, 2020.

Bolte, J.A. et al. "Towards Corner Case Detection for Autonomous Driving," arXiv:1902.09184vs [cs:CV] Feb. 26, 2019.

Koopman, P. "Edge Cases and Autonomous Vehicle Safety," Edge Case Research, SSS 2019, Bristol, Feb. 7, 2019.

Beck, J. et al. "Rare-Event Simulation," Springer International Publishing Switzerland 2015 R. Ghanem et al. (eds.), Handbook of Uncertainty Quantification, DOI 10.1007/978-3-319-11259-6_24-1, pp. 1-26.

Coelingh, E. et al., "Creating Driving Tests for Self-Driving Cars," IEEE Spectrum, Feb. 2018.

Liu, H. et al., "Real World Meets Virtual World: Augmented Reality Makes Driverless Vehicle Testing Faster, Safer and Cheaper," University of Michigan, pp. 1-8, Nov. 2018.

Stackpole, B. "Mcity Adds Augmented Reality to Driverless Car Testing Roadmap," Digital Engineering 247, Dec. 2018.

Gonzalez, D. et al., "A Review of Motrion Planning Techniques for Automated Vehicles," IEEE Transactions on Intelligent, Transportation Systems, vol. 17, No. 4, pp. 1135-1145, Apr. 2016.

Yurtsever, E., et al., "A Survey of Autonomous Driving: Common Practices and Emerging Technologies," IEEE Access, vol. 8, [cs. RO], Apr. 2020.

U.S. Appl. No. 16/797,103, filed Feb. 21, 2020, Systems and Methods for Generating Simulation Scenario Definitions for an Autonomous Vehicle System.

U.S. Appl. No. 16/797,109, filed Feb. 21, 2020, Play-Forward Planning and Control System for an Autonomous Vehicle.

U.S. Appl. No. 17/178,333, filed Feb. 18, 2021, Rare Event Simulation in Autonomous Vehicle Motion Planning.

* cited by examiner

IN-VEHICLE OPERATION OF SIMULATION SCENARIOS DURING AUTONOMOUS VEHICLE RUNS

BACKGROUND

Autonomous vehicles (AVs) contain many different systems that work together to allow a vehicle to drive itself. The AV achieves this by seeing the world, applying reasoning to the perceived data, and acting on decisions that it made through reasoning. To ensure that an AV will properly operate under many different scenarios, it is desirable to test an AV's reaction to many different combinations of perceived data.

However, testing of all combinations of data can be difficult. Some scenarios, such as testing reactions to other actors in an environment, require multiple actors to coordinate with the AV. Other situations could be risky to test with real-world actors or objects. To do this, in addition to real-world tests, AVs are often tested via simulated operating scenarios. However, testing by simulation runs the risk of not accurately testing how the AV would respond in a real-world environment.

To solve this problem, some have proposed the use of augmented reality to add simulated virtual environments to actual environments that an AV perceives. However, to date existing attempts to do this are not seamless and do not always yield reliable results.

This document describes methods and systems that address the problems described above, and/or other issues.

SUMMARY

This document describes methods by which an autonomous vehicle may deploy a simulation scenario while operating in a real-world environment. The vehicle will have sensors that collect perception data, which is sensed data that identifies and labels one or more perceived objects in the vehicle's environment, such as other vehicles, people, animals, stationary objects, etc. During a run of the vehicle in a real-world environment, the vehicle's on-board computing system will: (i) receive the perception data; (ii) publish the perception data to a muxing tool of the on-board computing system; (iii) generate simulation data that identifies and labels one or more simulated objects in the environment; (iv) publish the simulation data to the muxing tool; (v) use the muxing tool to add at least a portion of the simulation data to the perception data to yield augmented perception data; and (v) use at least a portion of the augmented perception data to make one or more navigation decisions based for the autonomous vehicle.

Optionally, before the muxing tool adds at least a portion of the simulation data to the perception data, the system may determine whether a conflict exists between a portion of the simulation data and a portion of the perception data to which the portion of the simulation data would be added. If the conflict can be corrected, the system will correct the conflict. If the conflict cannot be corrected, the system will discard the conflicting portion of the simulation data.

To determine whether a conflict exists, the system may analyze simulated objects in the simulation data and discard at least one simulated object that would conflict with one or more perceived objects in the simulation data by: (i) analyzing labels assigned to the perceived objects; (ii) analyzing labels assigned to the simulated objects; and (iii) identifying as the conflict one or more of the simulated objects having a label that matches a label assigned to one or more of the perceived objects. Another method of determining whether a conflict exists may include analyzing labels and identifiers assigned to the perceived objects, along with those assigned to the simulated objects, and identifying as a conflict one or more of the simulated objects having a label and an identifier that matches both a label and an identifier assigned to one or more of the perceived objects.

Another method of identifying a conflict may include receiving, from one or more sensors of the autonomous vehicle, vehicle characteristic data indicating one or more of the following: location, pose, speed, or trajectory of the autonomous vehicle. The system may determine that a conflict would exist if a simulated object was generated via a simulation scenario having vehicle characteristic requirements that conflict with the received vehicle characteristic data.

In some embodiments, the system also may monitor location data as received by one or more sensors of the autonomous vehicle. If so, it may only permit the muxing tool to generate augmented perception data when the location data corresponds to a designated simulation zone. Alternatively, the system may not generate the simulation data at all unless the location data corresponds to a designated simulation zone. In addition, the system may reset generation of the simulation data when the location data no longer corresponds to a designated simulation zone.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An autonomous vehicle (AV) is designed to consume and act upon actual perception data. "Perception data" is data that a vehicle receives in real time from one or more sensors that provide the vehicle with information about the current state of the vehicle's immediate surroundings. Perception data may include, for example, data received from one or more cameras, a LiDAR system, a radar system, a temperature sensor, a GPS sensor, a precipitation sensor and/or other sensors via which the system may perceive features of its immediate environment. An AV's perception system is the system that includes all such sensors, together with one or more processors and programming instructions that are operable to process perception data and identify actors and stationary objects in an environment.

Figure 1:
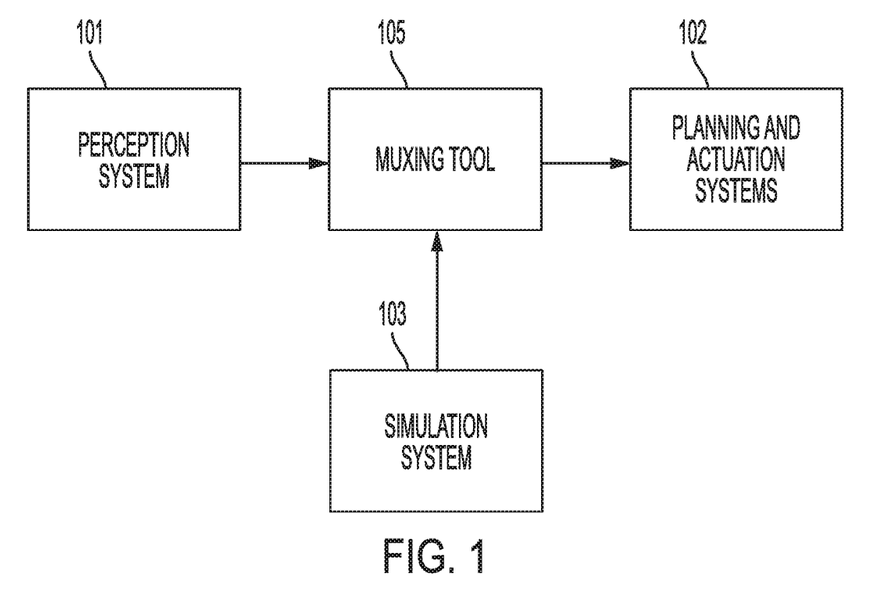
FIG. 1 illustrates core system components for deploying a simulation scenario in an autonomous vehicle (AV).

FIG. 1 is a block diagram illustrating core system elements of a computing system that will deploy a simulation scenario during an actual vehicle run. The AV's on-board computing system includes a perception system 101 as described above, along with motion planning and actuation systems 102 that include hardware and software that cause the AV to move and react to real-world conditions and actors. Example planning and actuation systems are known in the prior art and may include, for example, braking subsystems, steering subsystems, steering controllers, and the like, along with any number of processors and programming instructions that cause the vehicle make decisions about how and where to move around an environment in response to the perception data.

In typical operation of an AV, a stream of data from the perception system 101 is used by the planning and actuation systems 102, either directly or after some pre-processing to remove, for example, noise and/or potentially unreliable data. In the systems and methods of this document, perception data from the perception system 101 is routed to a muxing tool 105 before the data is sent to the planning and actuation systems 102. The muxing tool 105 also receives simulated perception data from a simulation system 103. The simulation system 103 will include processor(s), programming instructions and data sets of simulated actors and objects that an AV could perceive in a real-world environment, such as other vehicles, pedestrians, animals, and the like. The simulation system 103 may also be part of the AV's on-board computing system. Alternatively, the simulation system 103 may be in whole or in part a separate system that shares data with the AV via a communication link, such as a mobile electronic device that a rider in the vehicle carries, or a remote cloud-based computing system that communicates with the AV via a wireless communication network.

The simulated perception data may be stored in a simulation data set as simulation scenarios, generated in real time based on rules that identify simulations to apply to perceived real-world scenarios, or a combination of the two.

The muxing tool 105 includes one or more processors and programming instructions that cause the processor(s) to modify and augment the perception data with the simulation data to yield augmented perception data. In other words, "muxing", which also may be referred to as multiplexing or mixing, combines some or all of the simulation data into the perception data. The combined data is then delivered to the planning and actuation systems 102.

The real-world perception data will include various objects, each of which is assigned a category label and a unique identifier. The simulation data also will include various objects, each of which is assigned a category label and a unique identifier. These labels and identifiers will be described in more detail below. The muxing tool 105 will analyze identifiers of each of the perception data and the simulation data to avoid overwriting the real-world (perception) data in the event that a conflict exists in the data. In addition, the muxing tool 105 will help avoid conflicts between perceived objects within the perception data and simulated objects within the perception data. This will also be described in more detail below.

To augment the perception data with simulation data, the muxing tool may subscribe to system communication channels on which updates to perception data (i.e., real data received from sensors) and simulation data are published. The channel that publishes perception data will receive real-world data from the sensors, attach labels and other identifiers to the data, and publish it to the vehicle's motion planning system, optionally via the muxing tool. The channel that publishes simulation data will receive the data from a processor that is implementing a simulation scenario, as described below. The muxing tool may: (1) receive a perception message published by the perception system 101, in which the perception message includes one or more identifiers and multiple tracks; (2) receive a simulation message published by the simulation system 103, in which the simulation message also includes one or more identifiers and multiple tracks; and (3) append the simulation message tracks to the perception message tracks (without modifying or deleting the perception message tracks) to yield and publish a combined message that includes tracks from both the perception system 101 and the simulation system 103, such as:

Perception system publishes→Perception Message (Track1, Track2, Track3

Simulation system publishes→Sim Message (SimTrack1, SimTrack2)

Muxing combines to publish→TrackMessage (Track1, Track2, Track3, SimTrack1, SimTrack2).

In various embodiments, the processors of the perception system 101, motion planning and actuation system(s) 102, simulation system 103 and muxing tool 105 may be separate processors. Alternatively, some or all of these systems may share one or more processors of the vehicle's on-board computing system. As noted above, the simulation system may include hardware elements that are in whole or in part separate from the of-board computing system. In addition, any of the other system elements may use or incorporate off-board processing, data storage or programming instruction elements.

Figure 2:
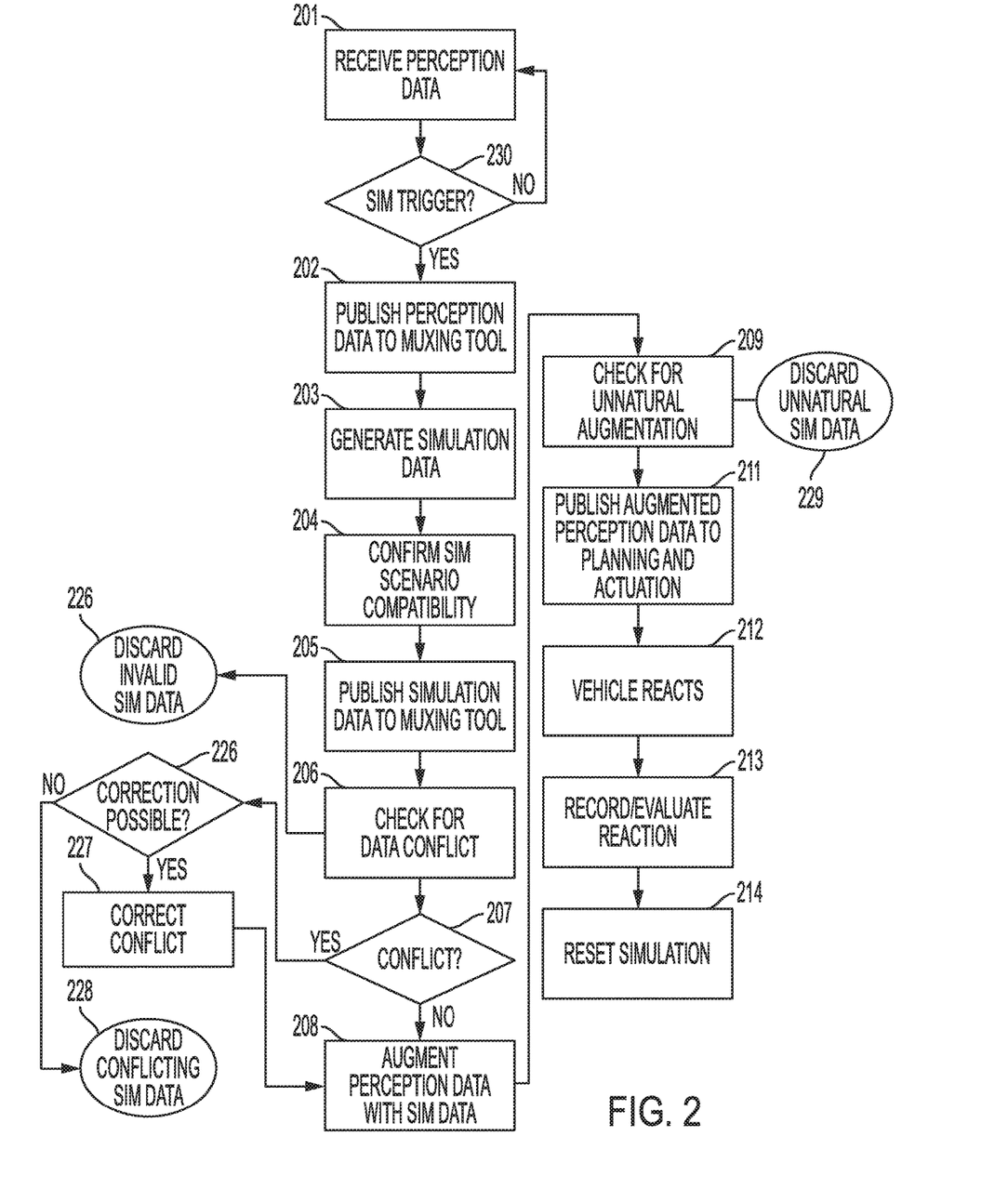
FIG. 2 is a flow diagram illustrating an example of an AV testing process using augmented reality.

FIG. 2 illustrates an example process by which an AV's on-board computing system may deploy a simulation scenario. At 201 during deployment of the AV the system receives perception data from one or more sensors of the AV's perception system. The perception data may include data representative of one or more perceived objects in the real-world environment. The perception system will process the data to identify the objects and assign categorical labels and unique identifiers to each object detected in a scene. Categorical labels may include categories such as vehicle, bicyclist, pedestrian, building, and the like, and the unique identifiers will help the system distinguish between multiple objects of a particular category in a scene (such as vehicle1, vehicle2, etc.) Methods of identifying objects and assigning categorical labels to objects are well known in the art, and any suitable classification process may be used, such as those that make bounding box predictions for detected objects in a scene and use convolutional neural networks or other computer vision models. Some such processes are described in Yurtsever et al., "A Survey of Autonomous Driving: Common Practices and Emerging Technologies" (arXiv Apr. 2, 2020). At 202 the system will publish the perception data (with its perceived object labels and identifiers) from the perception system in one or more tracks to the muxing tool. Each perception track will include a globally unique identifier (GUID) to distinguish it from other tracks.

At 203 the system will generate simulation data. The simulation data also will include one or more tracks with GUIDs, with simulated objects that do not appear in the real-world scene, along with categorical labels and unique identifiers for each simulated object. To generate the simulation data, the system may access a set of programming instructions that correspond to a simulation scenario, in which the instructions are to generate one or more simulated moving actors or other objects to place within the vehicle's environment. The simulation scenario may include a set of actors and, for at least some of the actors, movement sequences. The simulation data may be generated by loading a user-specified simulation scenario that contains the data, by loading a simulation scenario that is stored in a memory, or by other processes. When loading a scenario or offering candidate scenarios for a user to select, the system may use any suitable rule sets to automatically identify a simulation scenario, such as rules that require the system to select a scenario that has not yet been tested, or by randomly selecting a scenario. In addition, scenarios may be location-specific, and only may be run when the vehicle is within a particular location on a map, moving in a particular direction, and/or operating with a specified speed range. In either situation (manual selection or automatic selection of a scenario), the scenario may be deployed to the vehicle as configuration files, which are executed and/or accessed upon launch of the vehicle's motion planning and/or perception subsystems.

At 204 the simulation system may perform one or more initialization checks to assess the simulation scenario to determine whether it is compatible with the vehicle's current location and state. For example, each simulation scenario may include a map identifier (ID) indicating the region and/or version of a map for which the simulation scenario was designed. If the version ID, region ID, or other ID map that the vehicle is currently using does not match that of the simulation scenario, then the system will not apply the simulation scenario. Optionally, a user interface of the system (either in-vehicle, or in a remote system that is in communication with the vehicle) may notify the user of the incompatibility so that the user can initiate a download to the vehicle of either: (a) a map upgrade that is compatible with the simulation scenario; or (b) a simulation scenario that is compatible with the map.

At 205 the system will route the resulting compatible simulation data (with its object labels and identifiers) from the simulation system to the muxing tool.

At 206 the muxing tool may ensure the integrity of data received from the perception system and simulation system by checking to determine whether the simulation data may conflict with the perception data. To do this, the system may determine whether the same identifier is used for both data sets, or by calculating a checksum from each data set and determining whether the checksums match. Alternatively or in addition, the system may determine whether the vehicle's location, pose, speed, trajectory, or other characteristics conflict with requirements of the simulation scenario. The system may receive these characteristics from one or more vehicle position and orientation sensors, such as global positioning system (GPS) sensors; accelerometers, gyroscopes and/or inertial measurement units; cameras and/or LiDAR systems that provide visual representations of the environment in which the vehicle is moving; and/or near-field communication systems that receive signals from beacons or other transmitters that are positioned in the environment and which transmit location data to the vehicle. If a conflict exists, then the system may discard any simulated objects generated the conflicting conditions, and the system will consider the discarded objects in the planning and actuation operations (step 226).

At 207 the muxing tool may determine whether any simulated object would conflict with an actual object that appears in the real world. This may be done either before generating the preliminary augmented perception data to screen conflicts, or after generating the preliminary augmented perception data to identify conflicts within that data. A conflict may exist if two actors (one simulated, one real) will appear in a same location in the scene that the perception system is detecting. A conflict also may exist if a simulated object duplicates a real-world object, as identified by category (or optionally both category and identifier). For example, if the real-world perception data includes a deer that is about to cross the road, then a conflict may exist if the simulation data also includes a deer. As another example, if the real-world perception data includes three vehicles and the simulation data includes four vehicles, then conflicts may exist for the first three vehicles in the simulation data.

Some conflicts may be able to be corrected (226:yes). If so, the system may correct the conflict at 227. For example, if the simulation track has a GUID that conflicts with the perception data track's ID, the system may generate a new GUID for the simulation data that conflicted with the perception (real) data and append the new GUID to the simulation track. If the system cannot correct a conflict (226:no) (for example if a simulated object would conflict with a real-word object), then at 228 the muxing tool may discard any simulated data tracks that would conflict with the perception data as described above.

At 208 the muxing tool may then augment the perception data with the simulation data by combining the two and yielding preliminary augmented perception data, in which the simulated objects will appear in the real-world environment. This was described above, in which the simulation system tracks of a simulation message are appended to the perception data tracks of a perception message, without modifying the perception data tracks.

At 209 the system may determine whether any unnatural augmentation may occur during the muxing. Unnatural augmentation will occur if an error exists in the simulation data that will cause a simulated actor or other simulated object to appear incomplete and/or malformed when placed in the scene. This may be done at any step of the process (not necessarily in the position of the sequence shown in FIG. 2), whether before generating the preliminary augmented perception data to screen conflicts, or after generating the preliminary augmented perception data to identify conflicts within that data. At 229 the muxing tool may discard any simulated objects that appear to be unnatural if combined with the perception data as described above.

At 211 the resulting augmented perception data after any of steps 206, 208 and/or 209 are performed will be delivered to the vehicle's motion planning and actuation system. The vehicle will use motion planning techniques to react to the augmented perception data at 212. Example reactions may include causing the AVs brake system to actuate, causing the AV's acceleration subsystem to increase speed of the AV, or by causing the vehicle's steering subsystem to turn the AV. Various motion planning techniques are well known, for example as described in Gonzalez et al., "A Review of Motion Planning Techniques for Automated Vehicles," published in *IEEE Transactions on Intelligent Transportation Systems*, vol. 17, no. 4 (April 2016).

At 213 the system may record the AV's reaction and the augmented data (or an identifier for the augmented data set) so that the vehicle's system or an external server may assess such data and initiate any number of reactive motions to such data, The system may repeat this process for multiple simulation scenarios, or for multiple runs of the AV. If so, then the state of the simulation may be reset at 214 before each run. This may happen automatically, such as via the system detecting a proximity trigger—i.e., GPS data indicating that the AV has reached a designated endpoint of a run or existed a designated zone for simulation. Alternatively or in addition, simulation may be reset at 214 via a command input into the system by an operator by from a remote system.

In some embodiments, the simulation system may be separate from the AV, and the simulation system may transmit the simulation data to the AVs on a communication channel to which the AV is communicatively connected and subscribes. In this way, a simulation may be generated and published to multiple AVs in a fleet of AVs. Each AV's muxing tool will generate vehicle-specific augmented perception data that combines the published simulation data with vehicle-specific perception data that that AV's perception system collected. Each of the AVs may then transmit, on a vehicle-specific basis, navigation decisions that the AV made in response to its vehicle-specific perception data.

Typically, the system would not generate simulation data or combine simulation data with perception data until one or more triggers have occurred (230:yes). For example, the augmentation of perception data with simulation data may only be permitted when the vehicle is in designated geographic locations, such as designated zones, streets or other areas. If so, augmentation may be triggered when the AV's location matches a designated geographic location. The system may determine the AV's location using data received from the vehicle's global GPS and determining whether the vehicle's current GPS coordinates that match or are otherwise compatible with (such as by being in range of) the coordinates of a designated geographic location. Alternatively, the system may compare information about objects perceived by system cameras and/or LiDAR sensors (such as buildings, road signs, and other landmarks) to identify a map location that contains the perceived objects. Alternatively, the system may receive, via a near-field or other communication receiver, location signals from one or more traffic infrastructure beacons or other transmitters that are positioned in the environment.

In addition, upon startup of the vehicle the generation of simulation data and/or muxing tool operation may be disabled until an event occurs, such as a period of time lapsing or the vehicle reaching a geographic location in which a trigger is set for simulation data augmentation. In this case, simulation may be permitted (230:yes) only after the triggering event occurs.

Figure 3:
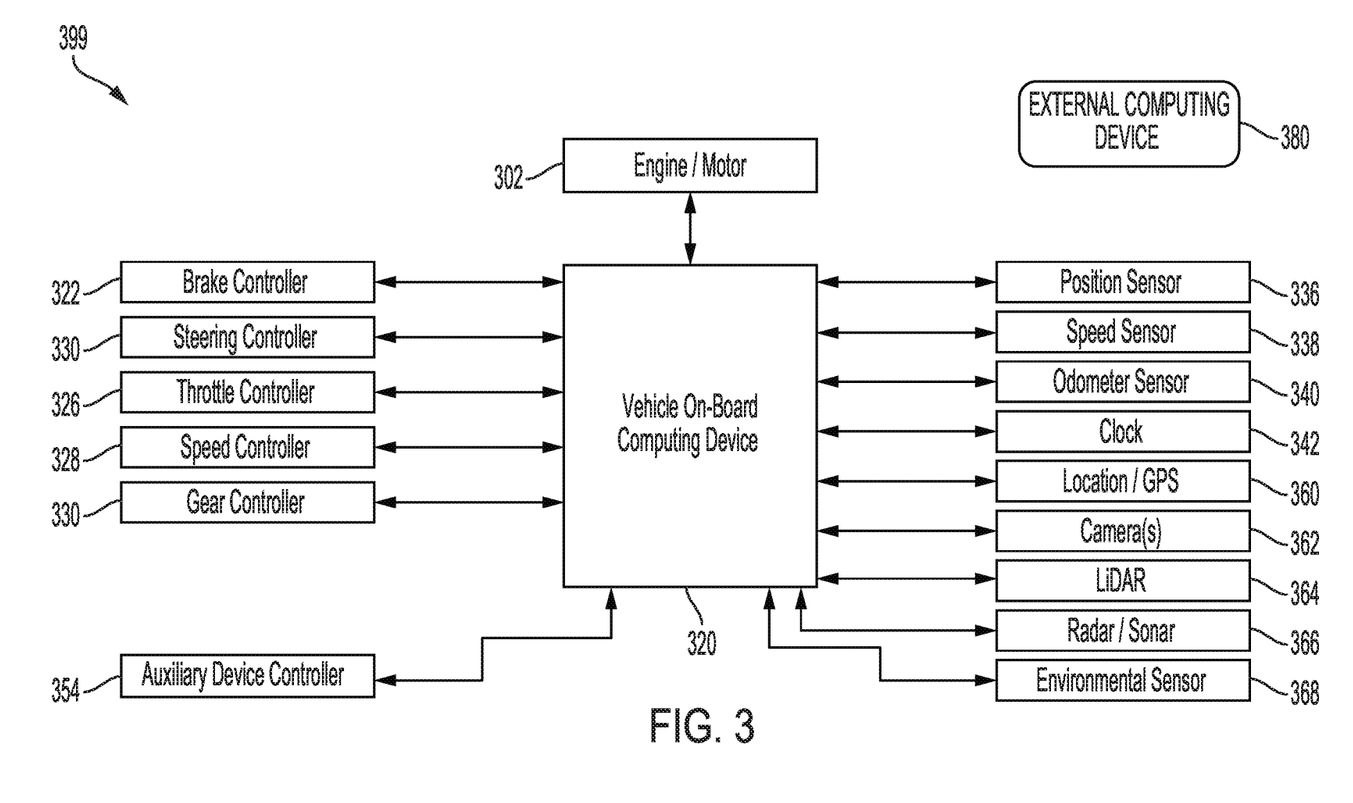
FIG. 3 illustrates example systems and components of an autonomous vehicle.

FIG. 3 illustrates an example system architecture for an autonomous vehicle 399, including additional details of system elements that are described at a high level in FIG. 1. The vehicle includes an engine or motor 302 to power movement of the vehicle, along with various sensors for measuring various parameters of the vehicle and/or its environment. Operational parameter sensors include, for example: a position sensor 336 such as an accelerometer, gyroscope and/or inertial measurement unit; a speed sensor 338; and an odometer sensor 340. The vehicle also may have a clock 342 that the system uses to determine vehicle time during operation. The clock 232 may be encoded into the vehicle on-board computing device, it may be a separate device, or multiple clocks may be available.

The vehicle's perception system will include various sensors that operate to gather information about the environment in which the vehicle is traveling. These sensors may include, for example: a location sensor 360 such as a global positioning system (GPS) device; object detection sensors such as one or more cameras 362; a LiDAR sensor system 364; and/or a radar and or and/or a sonar system 366. The sensors also may include environmental sensors 368 such as a precipitation sensor and/or ambient temperature sensor. The object detection sensors may enable the vehicle to detect moving actors and stationary objects that are within a given distance range of the vehicle 399 in any direction, while the environmental sensors collect data about environmental conditions within the vehicle's area of travel. The system will also include one or more cameras 362 for capturing images of the environment.

During operation of a vehicle run, information is communicated from the sensors to an on-board computing device 320. The on-board computing device 320 analyzes the data captured by the sensors and optionally controls operations of the vehicle based on results of the analysis. For example, the on-board computing device 320 may including programming instructions to provide motion planning and actuation operations to control vehicle movement systems. For example the motion planning function of the computing device 320 may control braking via a brake controller 322; direction via a steering controller 324; speed and acceleration via a throttle controller 326 (in a gas-powered vehicle) or a motor speed controller 328 (such as a current level controller in an electric vehicle); a differential gear controller 330 (in vehicles with transmissions); and/or other controllers.

Geographic location information may be communicated from the location sensor 360 to the on-board computing device 320, which may then access a map of the environment that corresponds to the location information to determine known fixed features of the environment such as streets, buildings, stop signs and/or stop/go signals. Captured images from the cameras 362 and/or object detection information captured from sensors such as a LiDAR system 364 is communicated from those sensors) to the on-board computing device 320. The object detection information and/or captured images may be processed by the on-board computing device 320 to detect objects in proximity to the vehicle 300. In addition or alternatively, the AV may receive and/or transmit any of the data to an external computing device 380 such as a cloud-based server via a transceiver for processing.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices 380 include an electronic device (such as a laptop or tablet computing device) associated with a person who is riding in the vehicle, as well as a remote server that is in electronic communication with the vehicle via a wireless communication network. The processor of any such device may perform the operations that will be discussed below.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

A "run" of a vehicle refers to an act of operating a vehicle and causing the vehicle to move about the real world. A run may occur in public, uncontrolled environments such as city or suburban streets, highways, or open roads. A run may also occur in a controlled environment such as a test track.

The term "object," when referring to an object that is detected by a vehicle perception system or simulated by a simulation system, is intended to encompass both stationary objects and moving (or potentially moving) actors, except where specifically stated otherwise by terms use of the term "actor" or "stationary object."

A "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, when relative terms of order such as "first" and "second" are used to modify a noun, such use is simply intended to distinguish one item from another, and is not intended to require a sequential order unless specifically stated.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A method of deploying a simulation scenario during an autonomous vehicle run, the method comprising:
by an on-board computing system of an autonomous vehicle during a run of the autonomous vehicle in a real-world environment:
receiving perception data from one or more vehicle sensors, wherein the perception data identifies and labels each of one or more perceived objects in the real-world environment;
publishing the perception data to a muxing tool of the on-board computing system;
detecting an occurrence of a trigger event;
enabling simulation operations in response to detection of the occurrence of the trigger event, the simulation operations comprising selection of a simulation scenario from a plurality of simulation scenarios and performance of the selected simulation scenario to generate simulation perception data that identifies and labels each of one or more simulated objects representing possible objects that the autonomous vehicle could perceive in the real-world environment;
identifying at least one said simulated object of the simulation perception data that is duplicative of an object in the perception data or has a same location in a scene as the object of the perception data;
modifying the simulation perception data to remove data therefrom that is associated with the at least one said simulated object which was identified;
publishing the simulation perception data to the muxing tool;
using the muxing tool to add at least a portion of the simulation perception data to the perception data to yield augmented perception data; and
using at least a portion of the augmented perception data to make one or more navigation decisions based for the autonomous vehicle.

2. The method of claim 1, further comprising, by the on-board computing system before the muxing tool adds at least a portion of the simulation perception data to the perception data:
determining whether a conflict exists between a portion of the simulation perception data and a portion of the perception data to which the portion of the simulation perception data would be added;
if the conflict can be corrected, correcting the conflict; and
if the conflict cannot be corrected, discarding the portion of the simulation perception data.

3. The method of claim 2, wherein the at least one said simulated object of the simulation perception data is identified as being duplicative of the object of the perception data based on an analysis of:
labels assigned to the perceived objects and
labels assigned to the simulated objects.

4. The method of claim 2, further comprising:
receiving, from one or more sensors of the autonomous vehicle, vehicle characteristic data indicating one or more of the following: location, pose, speed, or trajectory of the autonomous vehicle; and
wherein the portion of the simulation perception data that is discarded comprises at least one said simulated object that was generated via the selected simulation scenario having vehicle characteristic requirements that conflict with the received vehicle characteristic data.

5. The method of claim 1, wherein:
the perception data for each of the perceived objects includes an identifier and a label;
the simulation perception data for each of the simulated objects includes an identifier and a label; and
the at least one said imulated object of the simulation perception data is identified as being duplicative of the object of the perception data when the label and the identifier of the at least one said simulated object of the simulation perception data respectively match the label and the identifier of the perceived object.

6. The method of claim 1, further comprising:
monitoring location data as received by one or more sensors of the autonomous vehicle; and
only permitting the muxing tool to generate augmented perception data when the location data corresponds to a designated simulation zone.

7. The system of claim 1, further comprising:
monitoring location data as received by a one or more sensors of the autonomous vehicle; and
detecting the occurrence of the trigger event when the location data indicates that the autonomous vehicle is currently located in a designated geographic location.

8. The system of claim 7, further comprising resetting generation of the simulation perception data when the location data indicates that the autonomous vehicle is no longer within the designated geographic location.

9. The method of claim 1, wherein the simulation scenario is selected from the plurality of simulation scenarios by:
obtaining an identifier for a map that the autonomous vehicle is using;
identifying at least one of the plurality of simulation scenarios which has an identifier that is compatible with the identifier for the map; and
selecting the identified simulation scenario to generate the simulation perception data.

10. The method of claim 1, wherein:
the simulation perception data is also generated in part by a remote computing system that is external to the autonomous vehicle; and
the method further comprises, by the remote computing system:
publishing the simulation perception data to a fleet comprising the autonomous vehicle and one or more additional vehicles, and
receiving, from a plurality of the vehicles to which the simulation perception data was published, navigation decision data that is responsive to vehicle-specific augmented perception data.

11. A vehicle, comprising:
one or more sensors configured to collect data corresponding to objects;
an engine or motor configured to power movement of the vehicle; and
an on-board computing system comprising a processor and a memory device with programming instructions that are configured to cause the processor to, during a run of the vehicle in an real-world environment:
receive perception data from the one or more sensors, wherein the perception data identifies and labels each of one or more perceived objects in the real-world environment,
publish the perception data to a mixing tool of the on-board computing system,
detecting an occurrence of a trigger event,
enabling simulation operations in response to detection of the occurrence of the trigger event, the simulation operations comprising selection of a simulation scenario from a plurality of simulation scenarios and performance of the selected simulation scenario to generate simulation perception data that identifies and labels for each of the one or more simulated objects representing possible objects that the autonomous vehicle could perceive in the real-world environment,
identify at least one said simulated object of the simulation perception data that is duplicative of an object in the perception data or has a same location in a scene as the object of the perception data,
modifying the simulation perception data to remove data therefrom that is associated with the at least one said simulated object which was identified,
publish the simulation perception data to the mixing tool,
use the mixing tool to add at least a portion of the simulation perception data to the perception data to yield augmented perception data, and
use at least a portion of the augmented perception data to make one or more navigation decisions for movement of the vehicle.

12. The vehicle of claim 11, further comprising additional programming instructions that are configured to cause the processor to, before the mixing tool adds at least a portion of the simulation perception data to the perception data:
determine whether a conflict exists between a portion of the simulation perception data and a portion of the perception data to which the portion of the simulation perception data would be added;
if the conflict can be corrected, correct the conflict; and
if the conflict cannot be corrected, discard the portion of the simulation perception data.

13. The vehicle of claim 12, further comprising additional programming instructions that are configured to cause the processor to:
receive, from one or more position or location sensors of the autonomous vehicle, vehicle characteristic data indicating one or more of the following: location, pose, speed, or trajectory of the vehicle; and
wherein the portion of the simulation perception data that is discarded comprises at least one simulated object that was generated via the selected simulation scenario having vehicle characteristic requirements that conflict with the received vehicle characteristic data.

14. The vehicle of claim 11, wherein the at least one object of the simulation perception data is identified as being duplicative of the object of the perception data based on an analysis of:
labels assigned to the perceived objects; and
labels assigned to the simulated objects.

15. The vehicle of claim 11, wherein:
the perception data for each of the perceived objects also includes an identifier and a label;
the simulation perception data for each of the simulated objects also includes an identifier and a label; and
the at least one said simulated object of the simulation perception data is identified as being duplicative of the object of the perception data when:
the label and the identifier of the at least one said simulated object of the simulation perception data matches the label and the identifier of the perceived object of the perception data.

16. The vehicle of claim 11, further comprising additional programming instructions that are configured to cause the processor to:
monitor location data as received by one or more sensors of the vehicle; and
only permit the mixing tool to generate augmented perception data when the location data corresponds to a designated simulation zone.

17. The vehicle of claim 11, further comprising additional programming instructions that are configured to cause the processor to:

monitor location data as received by a one or more sensors of the vehicle; and detecting the occurrence of the trigger event when the location data indicates that the vehicle is currently located in a designated geographic location.

18. The vehicle of claim 17, further comprising additional programming instructions that are configured to cause the processor to reset generation of the simulation perception data when the location data indicates that the vehicle is no longer in the designated location.

19. The vehicle of claim 11, wherein the simulation scenario is selected from the plurality of simulation scenarios by:

obtaining an identifier for a map that the autonomous vehicle is using;

identifying at least one of the plurality of simulation scenarios which has an identifier that is compatible with the identifier for the map; and selecting the identified simulation scenario to generate the simulation perception data.

20. The vehicle of claim 11, wherein the vehicle is part of a fleet of vehicles that are all configured to receive at least a part of the simulation perception data from an external, remote computing system that is external to the vehicle.

21. A computer program product comprising a memory and programming instructions that are configured to cause a processor to during a run of an autonomous vehicle in a real-world environment:

receive perception data from one or more vehicle sensors, wherein the perception data identifies and labels each of one or more perceived objects in the real-world environment;

publish the perception data to a muxing tool of an on-board computing system;

detect an occurrence of a trigger event;

enable simulation operations in response to detection of the occurrence of the trigger event, the simulation operations comprising selection of a simulation scenario from a plurality of simulation scenarios and performance of the selected simulation scenario to generate simulation perception data that identifies and labels each of one or more simulated objects representing possible objects that the autonomous vehicle could perceive in the real-world environment;

identify at least one said simulated object of the simulation perception data that is duplicative of an object in the perception data or has a same location in a scene as the object of the perception data;

modify the simulation perception data to remove data therefrom that is associated with the at least one said simulated object which was identified;

publish the simulation perception data to the muxing tool;

use the muxing tool to add at least a portion of the simulation perception data to the perception data to yield augmented perception data; and use at least a portion of the augmented perception data to make one or more navigation decisions based for the autonomous vehicle.

* * * * *